United States Patent [19]

Horwitz

[11] Patent Number: 5,190,213
[45] Date of Patent: Mar. 2, 1993

[54] REUSABLE THERMALLY INSULATED FOOD DELIVERY BOX

[76] Inventor: Lawrence H. Horwitz, 1881 Keys Crescent, Cincinnati, Ohio 45206

[21] Appl. No.: 828,109

[22] Filed: Jan. 30, 1992

[51] Int. Cl.$^5$ .............................................. B65D 5/00
[52] U.S. Cl. .............................. 229/152; 229/DIG. 2
[58] Field of Search ................... 229/DIG. 2, 152; 220/430, 441, 659

[56] References Cited

U.S. PATENT DOCUMENTS

| | | | |
|---|---|---|---|
| 3,864,200 | 2/1975 | Marshall | 229/DIG. 2 |
| 4,286,006 | 8/1981 | Boelter | 428/182 |
| 4,332,344 | 6/1982 | Strodthoff | 383/120 |
| 4,600,142 | 7/1986 | Quaintance | 229/DIG. 2 |
| 4,709,852 | 12/1987 | Stoll | 229/916 |
| 4,828,894 | 5/1989 | Taylor | 229/199 |
| 4,886,179 | 12/1989 | Volk | 220/23.4 |
| 4,919,326 | 4/1990 | Deiger | 229/109 |
| 4,944,452 | 7/1990 | Kent et al. | 229/120 |
| 4,960,238 | 10/1990 | Lorenz | 229/125.27 |

Primary Examiner—Allan N. Shoap
Assistant Examiner—Christopher J. McDonald
Attorney, Agent, or Firm—Steven J. Rosen

[57] ABSTRACT

A reusable thermally insulated box to deliver hot or cold food is provided which is simple to use, easy to construct, economical, and ecologically more beneficial than boxes previously available. The present invention is particularly directed to a reusable pizza box made of corrugated plastic board having sealed fluted edges and creased or indented un-perforated scored fold lines between adjacent panels instead of conventional scored lines having perforations. This provides a thermally insulated food delivery box that may be sanitized and made suitable for reuse.

5 Claims, 1 Drawing Sheet

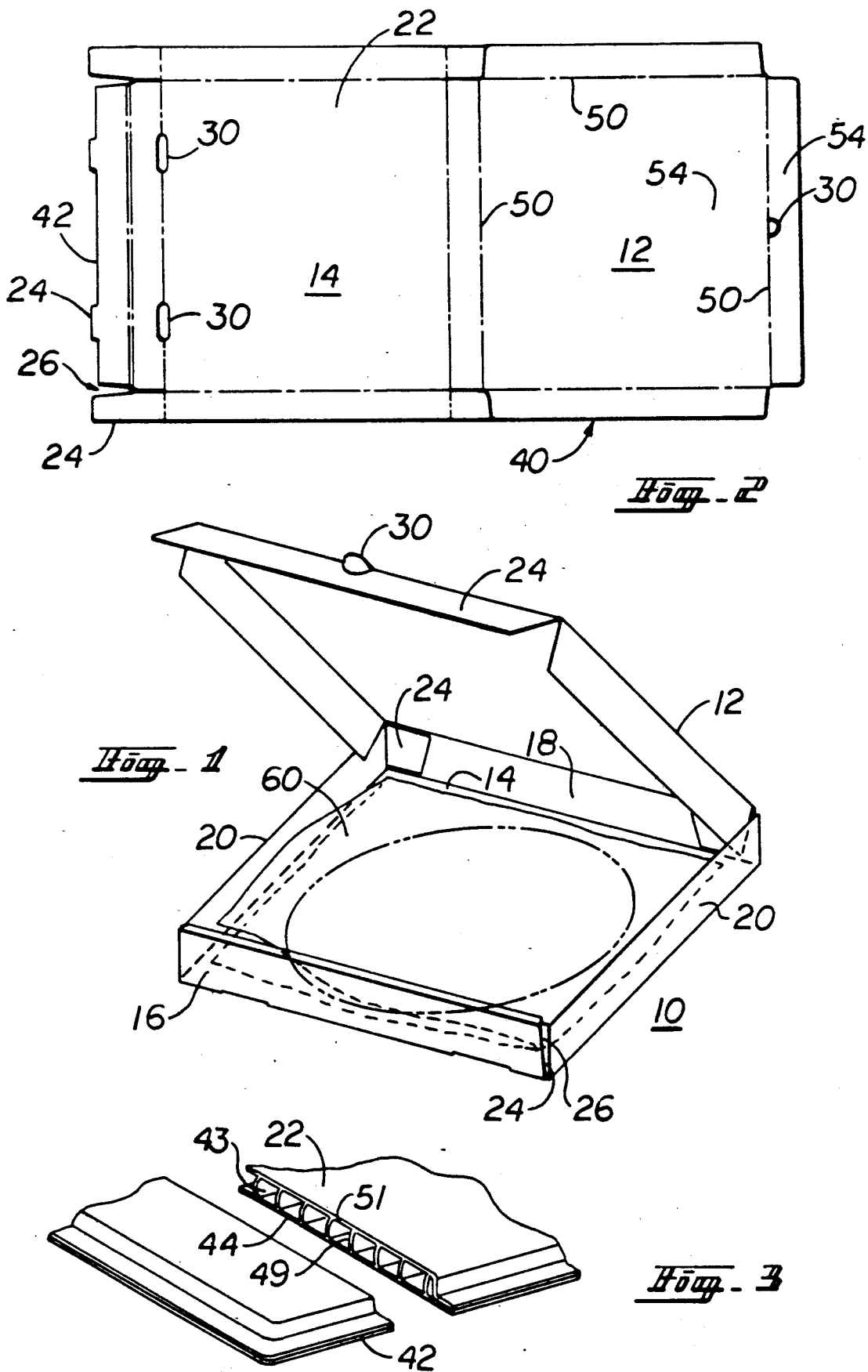

REUSABLE THERMALLY INSULATED FOOD DELIVERY BOX

BACKGROUND OF THE INVENTION

1. Field of the Invention

This invention relates to thermally insulated food delivery boxes for transporting hot or cold food, and more particularly pertains to a reusable food delivery box and method for delivering temperature controlled food to the consumer such as hot pizza.

2. Description of Related Art

The use of corrugated containers for the home delivery of hot food and in particular pizza is well known in the prior art. Heretofore, however, the prior art has failed to provide a reusable pizza box for home delivery that could be returned, sanitized, and reused thereby saving a great deal of money and paper and providing a more ecologically beneficial method of delivering pizza. Conventionally pizza boxes are constructed of a fiberboard material in the form of flat blanks having scored sections to form folded over panels used to shape the sides and top of the box. U S. Pat. No. 4,009,821, entitled "Hot -Food Transporting Box" by Thomas P. Hambleton, discloses a typical hot food delivery container incorporating a particular laminated construction of a fiberboard box formed from a blank to provide containment of heat there within, but fails to set forth a reusable container as set forth by the present invention.

A reusable container is disclosed in U.S. Pat. No. 4,886,179, entitled "Reusable container for a piece of pizza pie or other food product", by William T. Volk, which issued Dec. 12, 1989. The Volk patent describes a complicated and expensive thermoplastic interlockable container shaped in the general shape of a slice of pizza, such a device is not suitable for home delivery of pizza nor for use in a restaurant.

A corrugated plastic material of the generally preferred type in the present invention is disclosed in U.S. Pat. No. 4,286,006, entitled "Corrugated Material" by Lester B. Boelter, which issued Aug. 25, 1981. Disclosed, in the discussion of the prior art, is corrugated board constructed from plastic and appropriate adhesives. One such board is a fluted double faced sheet extruded from thermoplastic and resembling corrugated fiberboard which is commercially called PRIME COR-X ™ sheet and is manufactured by Primex Corporation of Oakland New Jersey. However, though the material may used in the present invention, the patent teaches to use the material for disposable items and away from the present invention of a reusable food delivery box.

SUMMARY OF THE INVENTION

The present invention provides a way to transport thermally insulated food, i.e. hot or cold food, to the consumer in a thermally insulated box which is both simple to use and easy to construct, is economical, and ecologically more beneficial than boxes previously available. The present invention is illustrated as and in one embodiment particularly directed to a reusable pizza box made of corrugated plastic board having sealed fluted edges for sanitizing. The box includes creased or indented un-perforated scored fold lines between adjacent panels instead of conventional perforated scored fold lines. More particular features include vents for permitting water vapor to escape, and a blank with creases for folding the box. One embodiment of the box includes a wax paper liner to surround the pizza. One aspect of the invention provides a method for delivering pizza in a reusable box including distribution, collection, and sanitizing the box before using it for its next delivery.

ADVANTAGES

Among the advantages provided by the present invention is relatively simple and inexpensive way of delivering hot foods, particularly pizza, in a more ecologically benign manner than has heretofore been used. The present invention saves money, paper, and forests.

BRIEF DESCRIPTION OF THE DRAWING

The foregoing aspects and other features of the invention are explained in the following description, taken in connection with the accompanying drawing where:

FIG. 1 is a perspective view of a reusable pizza delivery box in accordance with the preferred embodiment of the present invention.

FIG. 2 is a plan view of a blank for forming the box of the present invention.

FIG. 3 is a cross-sectional view of a sealed fluted edge of the box of in FIG. 1.

DETAILED DESCRIPTION OF THE INVENTION

While the preferred embodiment of my invention has been described fully in order to explain its principles, it is understood that various modifications or alterations may be made to the preferred embodiment without departing from the scope of the invention as set forth in the appended claims.

FIG. 1 illustrates a thermally insulated food delivery box in of the present invention provides in the form of a pizza box 10. Box 10 generally includes walls in the form of a top 12, a bottom 14, a front 16, a back 18, a left side 20, and a right side 20. Box 10 further includes a securing means in the form of a tab 24 designed to be received by a slot 26 with which it cooperates for holding closed the top 12 of the box. Vents 30 are formed in the walls to provide for venting vapor from the box 10 while maintaining its thermal insulation capability.

The box 10 is formed from a unitary blank 40 illustrated in FIG. 2 which is made from a corrugated plastic board material 22 such as COR-X manufactured by and commercially available from Primex Corporation of Oakland New Jersey. Blank 40 is constructed such that the corrugated plastic board has sealed fluted edges 42 for sanitizing purposes. The open fluted edges illustrates at 43 are created when the blank 40 is cut out forming fluted side edges 44. The open fluted edges 44 are sealed by a process such as compressive heat sealing forming sealed fluted edge 42 so that channels 49 between corrugation walls 51 are sealed against contamination and water. Referring briefly to FIGS. 2 and 3, fluted edges 42 are also formed on various features such as tabs 24, slots 26, and vents 30 that are cut partially cut into the blank 40 and that cut across the corrugations.

Referring again to FIG. 2, the blank 40 box includes non-perforated scored fold lines 50 instead of conventionally perforated scored lines between adjacent panels 54 of the blank used to form the walls of the box 10 shown in FIG. 1. Fold lines 50 may be formed by the use of a scoring die in a process which bends the corrugated material across the corrugations to break them, forming the scored folding line, while not perforating the material.

Referring again to FIG. 2, the walls of box 10, top 12, bottom 14, front 16, back 18, left side 20, and right side 20 are all panels on blank 40 separated from adjacent panels by un-perforated scored fold lines 50. The blank 40 and it cutout features can be die cut with heated but otherwise standard die cutting equipment to seal the fluted edges 42.

One embodiment of the box 10 includes a wax paper liner 60 to surround the hot food such as a pizza shown in FIG. 1. The use of the wax paper liner may simplify and improve the sanitizing process of the present invention. One aspect of the invention provides a method for delivering food such as pizza in a reusable thermally insulated box. The food delivery method includes delivery of the food in the reusable thermally insulated food delivery box, and the collection, and sanitizing the box before using it for its next delivery.

Standard sanitizing procedures may be used such as the following. Wash the reusable box 10 in a hot detergent solution in a first sink compartment and rinse it of detergent and abrasive in clear hot water in a second sink compartment. Then immerse all items for at least one minute in a solution of water and:

A. at least 50 ppm available chlorine, or
B. at least 12.5 ppm iodine (in water a pH of 5.0 or less), or
C. at least 200 ppm quaternary ammonia Regardless of the chemical used, the water temperature should be between 75 degrees F. and 120 degrees F. (unless using a quaternary ammonia formulated and State or US EPA tested to be effective in cooler water).

Starting with twice the strengths indicated above will help offset ppm reduction caused by dissipation, dilution and attrition. The starting and reduction strengths should be monitored by using test strips.

Collection may be done by subsequent deliveries which will enhance both the effectiveness of reusing the box 10 for environmental purposes and the amount of business conducted. Inducements may be used such as coupons or deposits to encourage the customers to participate in the campaign.

While the preferred embodiment of the present invention has been described fully in order to explain its principles, it is understood that various modifications or alterations may be made to the preferred embodiment without departing from the scope of the invention as set forth in the appended claims.

I claim:

1. A reusable box for delivering thermally insulating food, said box comprising:

top, bottom, and side wall panels appropriately interconnected to form a closable container,
   said wall panels constructed from a corrugated plastic material having plastic corrugations and capable of being sanitized for the delivery of food, and
   said panels having sealed fluted edges such that the resusable box is capable of being sanitized.

2. A resusable box as claimed in claim 1 wherein said box is formed from a single blank.

3. A reusable box as claimed in claim 1 wherein said panels are foldable with respect to adjacent ones of said panels along un-perforated fold lines.

4. A reusable box blank to form a box for delivering thermally insulating food, said reusable box blank comprising:

top, bottom, and side wall panels appropriately interconnected to form a closable container,
   said panels are foldable with respect to adjacent ones of said panels along un-perforated fold lines,
   said wall panels constructed from a corrugated plastic material having plastic corrugations and capable of being sanitized for the delivery of food, and
   said panels having sealed fluted edges such that the resusable box is capable of being sanitized.

5. A reusable box as claimed in claim 3 further comprising a wax paper liner.

* * * * *